(12) United States Patent
Koopmans

(10) Patent No.: US 7,089,912 B2
(45) Date of Patent: Aug. 15, 2006

(54) METHOD, AN ARRANGEMENT, AND A COMPUTER READABLE STORAGE DEVICE FOR CONTROLLING HOMOGENEOUS CHARGE COMPRESSION IGNITION COMBUSTION

(75) Inventor: Lucien Koopmans, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 10/882,599

(22) Filed: Jul. 1, 2004

(65) Prior Publication Data
US 2005/0188955 A1   Sep. 1, 2005

(30) Foreign Application Priority Data
Jul. 1, 2003   (EP) .................................. 03077060

(51) Int. Cl.
*F02P 5/00* (2006.01)
(52) U.S. Cl. ................................ 123/406.45; 123/90.15
(58) Field of Classification Search ................ 123/435, 123/90.15, 406.41, 406.45, 406.47, 568.14
See application file for complete search history.

(56) References Cited

U.S. PATENT DOCUMENTS

| | | | |
|---|---|---|---|
| 5,878,717 A * | 3/1999 | Zur Loye | .................... 123/435 |
| 6,336,436 B1 | 1/2002 | Miyakubo et al. | |
| 6,390,054 B1 | 5/2002 | Yang | |
| 6,508,229 B1 | 1/2003 | Miyakubo et al. | |
| 6,536,407 B1 | 3/2003 | Denbratt | |
| 6,581,551 B1 | 6/2003 | Denbratt | |
| 6,644,275 B1 * | 11/2003 | Kondo | .................... 123/406.47 |
| 6,739,295 B1 * | 5/2004 | Yamaoka et al. | ......... 123/90.15 |
| 6,840,235 B1 * | 1/2005 | Koseki et al. | ......... 123/568.14 |
| 2003/0056736 A1 | 3/2003 | Unger et al. | |
| 2004/0230364 A1 * | 11/2004 | Uchida et al. | .............. 701/101 |

FOREIGN PATENT DOCUMENTS

EP   1 201 903 A1   5/2002

OTHER PUBLICATIONS

SAE 2001-01-3610, Koopmans et al., "A Four Stroke Camless Engine, Operated in Homogeneous Charge Compression Ignition Mode with Commercial Gasoline", San Antonio, Texas, Sep. 24-27, 2001.

* cited by examiner

*Primary Examiner*—Mahmoud Gimie
(74) *Attorney, Agent, or Firm*—Allan J. Lippa; Alleman Hall McCoy Russell & Tuttle LLP

(57) ABSTRACT

The invention relates to a method for operating an internal combustion engine operable in compression ignition mode, said engine comprising a fuel supply means, a piston in each cylinder causing ignition during compression ignition mode, at least one inlet and one exhaust valve, a control unit that controls the valve timing and fuel quantity, and at least one sensor for measuring an engine operation parameter. The following steps are performed when switching from spark ignition to compression ignition mode: controlling the exhaust and intake valves to perform a negative valve overlap to retain exhaust residual gas, determining a current combustion phasing timing, and correcting the combustion phasing by increasing the retained exhaust residual gas fraction by stepwise control of a combustion related parameter. The invention further relates to an arrangement and a computer readable device for controlling the combustion process.

11 Claims, 4 Drawing Sheets

METHOD, AN ARRANGEMENT, AND A COMPUTER READABLE STORAGE DEVICE FOR CONTROLLING HOMOGENEOUS CHARGE COMPRESSION IGNITION COMBUSTION

TECHNICAL FIELD

The invention relates to an internal combustion engine that can be operated in homogeneous charge compression ignition combustion and spark ignition modes, as well as a method for controlling such an engine.

BACKGROUND

To improve thermal efficiency of gasoline internal combustion engines, lean burn is known to give enhanced thermal efficiency by reducing pumping losses and increasing ratio of specific heats. Generally speaking, lean burn is known to give low fuel consumption and low NOx emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporised fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures.

When certain conditions are met within a homogeneous charge of lean air/fuel mixture during low load operation, homogeneous charge compression ignition (HCCI) can occur wherein bulk combustion takes place initiated simultaneously from many ignition sites within the charge, resulting in very stable power output, very clean combustion and high fuel conversion efficiency. NOx emission produced in controlled homogeneous charge compression ignition combustion is extremely low in comparison with spark ignition (SI) combustion based on propagating flame front and heterogeneous charge compression ignition combustion based on an attached diffusion flame. In the latter two cases represented by spark ignition engine and diesel engine, respectively, the burned gas temperature is highly heterogeneous within the charge with very high local temperature values creating high NOx emission. By contrast, in controlled homogeneous charge compression ignition combustion where the combustion is rather uniformly distributed throughout the charge from many ignition sites, the burnt gas temperature is substantially homogeneous with much lower local temperature values resulting in very low NOx emission.

Engines operating under controlled homogeneous charge compression ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

In all the above cases, the range of engine speeds and loads in which controlled homogeneous charge compression ignition combustion can be achieved is relatively narrow. The fuel used also has a significant effect on the operating range; for example, diesel and methanol fuels have wider auto-ignition ranges than gasoline fuel. A further problem is to achieve ignition at a particular time with maintained combustion stability, while avoiding engine knocking and misfiring.

HCCI has no flame propagation, therefore, instead, the combustion is kinetically controlled. The lack of flame propagation causes the temperature distribution in the combustion chamber in contrary to normal flame propagation to be almost homogeneous, leading to NOx emissions reduction from thousands of ppm to an order of ten ppm. Because of the kinetically controlled combustion, the heat release can be very fast which opens the possibility to generate a theoretically perfect Otto (constant volume combustion). Only very lean or diluted (air or residual gas fraction) fuel/air mixtures can be combusted provided that the compression temperature is high enough.

A problem in connection with homogeneous compression ignition is to control the ignition delay i.e. cylinder temperature in a way that the combustion phasing is correct at varying speed and load conditions of the engine.

One way to realize HCCI combustion is to manipulate the compression temperature and degree of dilution i.e. control the ignition delay and reactivity of the fuel/air mixture through different valve timing events possibly in combination with variable valve timing.

HCCI combustion generated using the methods described in the above SE-applications is dependent on the presence of residual gas fraction, which requires a mode change between conventional SI combustion and HCCI combustion to initiate HCCI engine operation.

As stated above, a general problem is the difficulty in controlling HCCI combustion. When the combustion phasing is correct, the engine efficiency is high i.e. fuel consumption is low.

Too early auto-ignition will cause the engine to knock and the engine efficiency to drop. Knocking combustion, resulting from pressure waves caused by the combustion process, is both harmful for the engine and unpleasant for the driver/passenger of the car because of generated engine noise. Too late auto-ignition will cause the engine cycle to cycle variations to increase. Increased cycle-to-cycle variations can cause the engine to knock and misfire. If a misfire occurs during HCCI operation, the engine will die when the auto-ignition is generated by trapped residual gas fraction of the previous combustion cycle. Following a misfire, the temperature of the trapped gas will be insufficient for achieving auto-ignition in the subsequent cycle. When changing mode between conventional SI engine operation and HCCI engine operation the switch is accomplished within one engine cycle. Directly after the mode change the auto-ignition timing may be advanced, whereby it is progressively retarded over a number of subsequent cycles until the combustion has stabilised. This is illustrated in FIG. 1, where an arrow A indicates retardation of subsequent cycles $C_1, C_2, C_3, C_4$. The extremely early combustion phasing of the first few HCCI cycles, have an impact on engine load. This is apparent from FIG. 2, where the load in Net Mean Effective Pressure (NMEP) is shown for a few engine cycles before, during, and after a mode change. Due to better fuel conversion efficiency, the load in HCCI mode is higher compared to SI mode. A more detailed analysis of this problem can be found in the SAE paper 2003-01-0753.

Hence an object of the invention is to control the ignition timing during auto-ignition, which means allows for monitoring of a current combustion and for correction of a subsequent combustion dependent on the outcome of the monitoring process.

SUMMARY OF INVENTION

The above problems are solved by a method, an arrangement and a computer readable storage device for controlling homogeneous charge compression ignition combustion, according to claims 1, 2 and 4, and their respective dependent claims.

The residual gas fraction may be increased for every engine cycle, for the first couple of engine cycles after a mode change. This is done by changing the valve timing event and or exhaust manifold gas pressure stepwise for every engine cycle for the first couple of engine cycles after a mode change until the auto ignition timing stabilises and generates the correct combustion phasing.

The fresh air amount is decreased for every engine cycle, for the first couple of engine cycles after a mode change. This is done by changing the valve timing event and or manifold air pressure for every engine cycle for the first couple of engine cycles after a mode change until the auto ignition timing stabilizes and generates the desired combustion timing.

The cycle temperature of a Si engine cycle is higher than the cycle temperature of a HCCI engine cycle. Both the cylinder walls and the residual gas fraction have a higher temperature during a SI engine cycle. The mode switch between Si engine operation and HCCI engine operation occurs within one engine cycle. The first HCCI combustion is therefore triggered by the residual gas fraction of the last SI engine cycle. The auto-ignition timing of the first HCCI engine cycle ($IT_1$) is triggered by the temperature rise due to the residual gas fraction of the last SI engine cycle ($R_1$), the fresh air amount ($F_1$) and the wall temperature ($W_1$). Due to the lower cycle temperature of the first HCCI engine cycle, the temperature of the residual gas fraction ($R_2$) is lower. The cylinder wall temperature ($W_2$) will be lower as more fresh air is admitted into the combustion chamber, and hence the auto-ignition timing ($IT_2$) will be later. To ensure the correct auto-ignition timing i.e. combustion phasing for the second HCCI cycle, the residual gas fraction ($R_2$) is greater or the fresh air amount ($F_2$) is less. The same trend can be valid for the third, the fourth, etc. HCCI engine cycle until equilibrium in temperature is reached.

Hence, after a mode change between SI and HCCI engine operation, the residual gas fraction is increased until temperature equilibrium is reached and or the fresh air fraction is decreased until temperature equilibrium is reached.

According to a preferred embodiment the invention relates to a method for operating an internal combustion engine provided with at least one cylinder and operable in compression ignition mode. The engine has a fuel supply, through which fuel is supplied to a combustion chamber, a piston in the engine cylinder whose compression action causes a mixture of air and fuel within the combustion chamber to be ignited during compression ignition mode, at least one inlet valve for admitting gas which includes fresh air into the cylinder, at least one exhaust valve for exhausting combusted gases from the cylinder, a control unit that controls the timing for each of the inlet and exhaust valves and fuel quantity per combustion cycle supplied by each fuel supply means, and a sensor for measuring an engine operation parameter. To switch from spark ignition to compression ignition mode the exhaust and intake valves are controlled to perform a negative valve overlap to retain exhaust residual gas, a current combustion timing is determined, and combustion timing is adjusted by increasing the retained exhaust residual gas fraction. The combustion timing may be corrected by selecting a value from a matrix dependent on current engine load and speed. Alternatively, the combustion timing may be determined by measuring at least one combustion related engine parameter and comparing the measured combustion timing with a desired combustion timing for the current engine load.

According to a further embodiment the valve timing is controlled to increase the residual gas fraction. This can be achieved by adjusting the exhaust valve closing (EVC) timing and the intake valve opening (IVO) timing. Alternatively, the exhaust valve opening (EVO) timing is adjusted, either individually or in combination with the EVC and IVO timings.

According to a further embodiment the exhaust manifold gas pressure is increased to increase the residual gas fraction. This is achieved by controlling a valve in the exhaust conduit or by selecting a suitable EVO timing to make use of exhaust pressure pulses in the conduit. These measures may be taken in combination with the valve timing control described above.

According to a further embodiment the combustion phasing is corrected by decreasing of intake air amount, e.g. by valve timing control. This is achieved by adjusting the exhaust valve closing (EVC) timing and the intake valve opening (IVO) timing. Alternatively, the intake valve closing (IVC) timing is adjusted, either individually or in combination with the EVC and IVO timings.

According to a further embodiment the intake manifold air pressure is reduced to decrease the intake air amount. This is achieved by controlling a throttle in the intake conduit.

By using the above methods, it is possible to correct the cycle temperature by increasing negative valve overlap. The negative valve overlap is increased by retarding IVO and/or advancing EVC.

The above method for correcting the combustion timing is carried out during a predetermined number of engine cycles after mode change or until compression ignition combustion timing is stable.

According to a further embodiment, the invention relates to an internal combustion engine provided with at least one cylinder having a fuel supply through which fuel is supplied to a combustion chamber, a piston in the engine cylinder whose compression action causes a mixture of air and fuel within the combustion chamber to be ignited, at least one inlet valve for admitting gas which includes fresh air into the cylinder, at least one exhaust valve for exhausting combusted gases from the cylinder, a control unit that controls the timing for each of the inlet and exhaust valves and fuel quantity per combustion cycle supplied by each fuel supply means, and a sensor for measuring an engine operation parameter. When performing a switch between spark ignition and compression ignition mode the exhaust valve is arranged to be closed before top dead center during an exhaust stroke of the piston and the intake valve is arranged to be opened after top dead center during an induction stroke of the piston, in order to achieve a negative overlap and retain residual exhaust gas. A sensor determines a current combustion phasing timing, and the control unit is arranged to adjust intake and exhaust valve timing to increase the negative overlap in steps during number of engine cycles following a mode switch. The size of the step for a subsequent cycle is dependent on the combustion phasing for the current cycle.

According to a further embodiment the control unit is arranged to adjust intake and exhaust valve timing during a predetermined number of engine cycles after a mode change or until the compression ignition timing is stabilized.

According to a further preferred embodiment the invention relates to a computer readable storage device having stored therein data representing instructions executable by a computer to implement a mode switch from spark ignition to compression ignition for an internal combustion engine, the engine having a piston disposed in a cylinder to define a combustion chamber, intake valves for admitting fresh air into the cylinder, a fuel supply means for supplying fuel to the combustion chamber, and exhaust valves for discharging exhaust gas resulting from combustion within the cylinder, wherein opening and closing timings of the intake valves and opening and closing timings of the exhaust valves are adjustable. The computer readable storage device has instructions for adjusting opening and closing timings of the intake valves and opening and closing timings of the exhaust valves such that the piston reciprocates within the cylinder to perform an exhaust phase, an exhaust gas retaining phase, an intake phase, a compression phase, and an expansion phase, instructions for closing the exhaust valve before top dead center during an exhaust stroke of the piston and opening the intake valve after top dead center during an induction stroke of the piston, to achieve a negative overlap and retain residual exhaust gas, instructions for determining a current combustion phasing timing, and instructions for the control unit to adjust intake and exhaust valve timing to increase the negative overlap in steps during number of engine cycles following a mode switch, where the size of the step for a subsequent cycle is dependent on the combustion phasing for the current cycle.

According to a further embodiment the computer readable storage device includes instructions for correcting the combustion phasing by selecting a value from a matrix dependent on current engine load and speed.

According to a further embodiment the computer readable storage device further includes instructions for determining the combustion phasing by measuring a combustion related engine parameter, and instructions for comparing the measured combustion phasing with a desired combustion phasing for the current engine load.

BRIEF DESCRIPTION OF DRAWINGS

In the following text, the invention is described in detail with reference to the attached drawings. These drawings are used for illustration only and do not in any way limit the scope of the invention. In the drawings.

DETAILED DESCRIPTION

Figure 3:
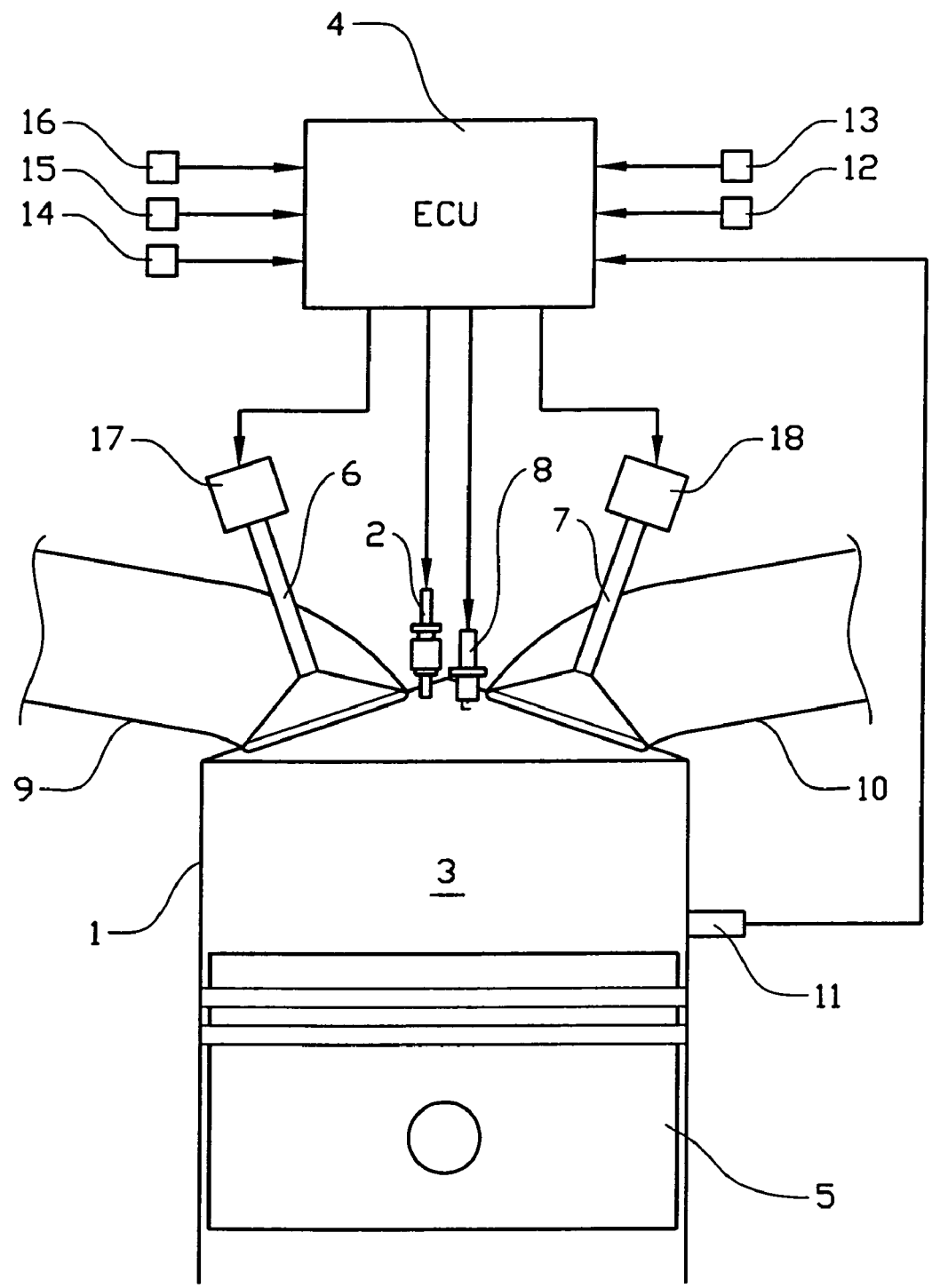
FIG. 3 shows a schematic internal combustion engine according to the invention.

FIG. 3 shows a schematic illustration of an internal combustion engine according to the invention. The engine is provided with at least one cylinder 1 and comprises a fuel injector 2, through which fuel is injected into a combustion chamber 3, for each cylinder. A fuel injection control unit 4 controls fuel injection quantity per combustion cycle injected through each fuel injector. A piston 5 in the engine cylinder has a compression action that causes a mixture of air and fuel within the combustion chamber to be ignited during HCCI-mode. The cylinder is provided with at least one inlet valve 6 for admitting gas which includes fresh air into the cylinder and at least one exhaust valve 7 for exhausting combusted gases from the cylinder. Air is supplied through an intake conduit 9 connected to an intake manifold, while exhaust gas is exhausted through an exhaust conduit 10. During SI-mode, the ignition of the fuel/air mixture is ignited by a spark plug 8.

The control unit receives signals from at least one sensor for measuring engine operation parameters, which sensors include a combustion chamber pressure sensor 11, an intake manifold pressure sensor 12 and a λ-probe 13 in the exhaust conduit, as well as temperature sensors for intake air 14, engine coolant 15 and engine oil 16. The control unit controls the intake and exhaust valves 6, 7 by means of valve actuators 17, 18. The actuators may be either electrically, hydraulically or mechanically operated.

Although FIG. 3 shows a direct injected (DI) engine, the invention is not limited to DI engines. The number of intake and exhaust valves per cylinder and the number and types of sensors used may also be varied within the scope of the invention. For instance, the physical pressure sensor described may also be a virtual sensor or some other means for indicating combustion timing, or heat release timing. If required, the invention can also be applied to an open loop system receiving no sensor feedback.

Figure 4:
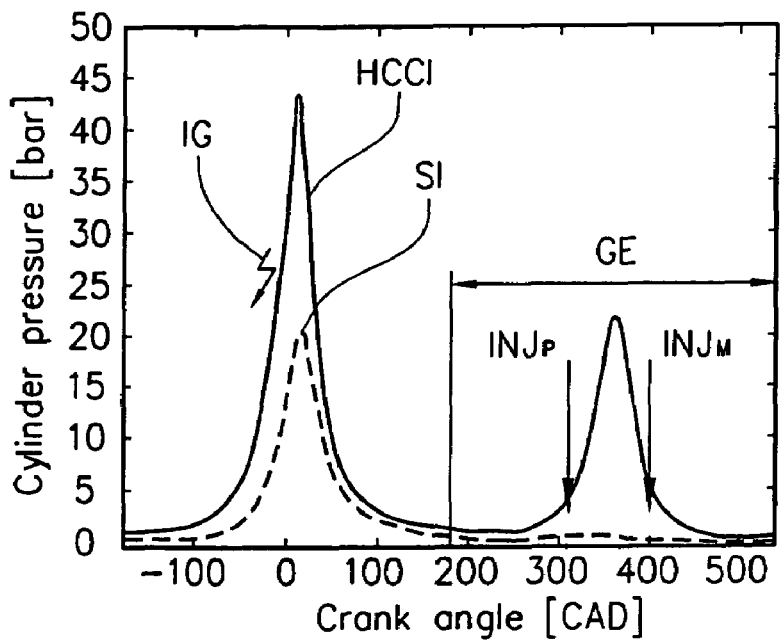
FIG. 4 shows a diagram illustrating the variation of cylinder pressure over crank angle for HCCI- and SI-mode.

FIG. 4 shows a diagram illustrating the variation of cylinder pressure over crank angle for HCCI- and SI-mode. As can be seen from the curves in the diagram, the engine can be operated in homogeneous charge compression ignition (HCCI) combustion mode and in conventional spark ignited (SI) combustion mode. The HCCI combustion has no moving flame front, as opposed to a SI combustion that has a moving flame front. The lack of a flame front reduces temperature and increases the heat release rate hence increases the thermal efficiency of the combustion. An increased dilution ratio for the same compression ratio, in an unthrottled engine, will result in a considerably higher peak pressure after ignition, typically in excess of 40 bar, as opposed to about 20 bar in SI mode. The main difference between the HCCI- and SI modes is that a part of the combustion residuals are captured by operating the engine with a negative valve overlap. The negative valve overlap is achieved by closing the exhaust valve, or valves, before piston top dead center (TDC) and opening the inlet valve, or valves, after piston TDC in the gas exchange phase (GE) of the combustion, as illustrated in FIG. 4. During the air intake phase, residuals increase the temperature of the mixture so that the auto ignition temperature is reached before TDC and dilutes the mixture so that the heat release rate decreases to an acceptable level. By controlling the heat release, noise and knocking combustion can be reduced.

The abbreviations used in the text and/or figures are as follows:
EVC=Exhaust Valve Closing
EVO=Exhaust Valve Opening
IVO=Intake Valve Opening
IVC=Intake Valve Closing
SIG=Spark Ignition
CIG=Compression Ignition
INJ=Fuel Injection (single or split direct injection, or port injection)

Fuel injection during HCCI mode can be performed as a single port or direct injection $INJ_S$, preferably but not necessarily before TDC during the negative valve overlap, or as a split fuel injection by means of a pilot direct fuel injection $INJ_P$ before TDC during the negative valve overlap and a main direct fuel injection $INJ_M$ after TDC of the negative valve overlap. The relative quantities of fuel injected during the single, or the pilot and the main injections can be varied and are calculated and controlled by a fuel injection control unit (see FIG. 3). The fuel of the single or the pilot injection $INJ_P$ will react in the retained residuals, forming radicals, intermediates or combustion products. This reaction can be_exothermic hence heating the residuals, resulting in earlier timing of the auto ignition temperature. A prerequisite for this reaction is the presence of excess oxygen, without which the reaction will stop before it is completed. When the engine is operated in HCCI-mode the control unit must adjust the value of λ to be sufficiently high for all engine operating conditions to ensure this. The total quantity of injected fuel for the pilot and the main injection is substantially constant with respect to the current engine operating conditions, such as engine speed, engine load and efficiency. The quantity of the first injection is selected to be in the range of $0<INJ_P<45\%$ of the total amount of injected fuel.

Due to the demand for dilution, which controls the rate of heat release, only the part load regime of the engine is used for HCCI combustion mode. The auto ignition timing for HCCI operation can be controlled by the pilot fuel injection and/or the captured amount of residuals and/or the absolute manifold pressure. The latter may be controlled by increasing the pressure of the intake air by means of a compressor or turbocharger.

Figure 1:
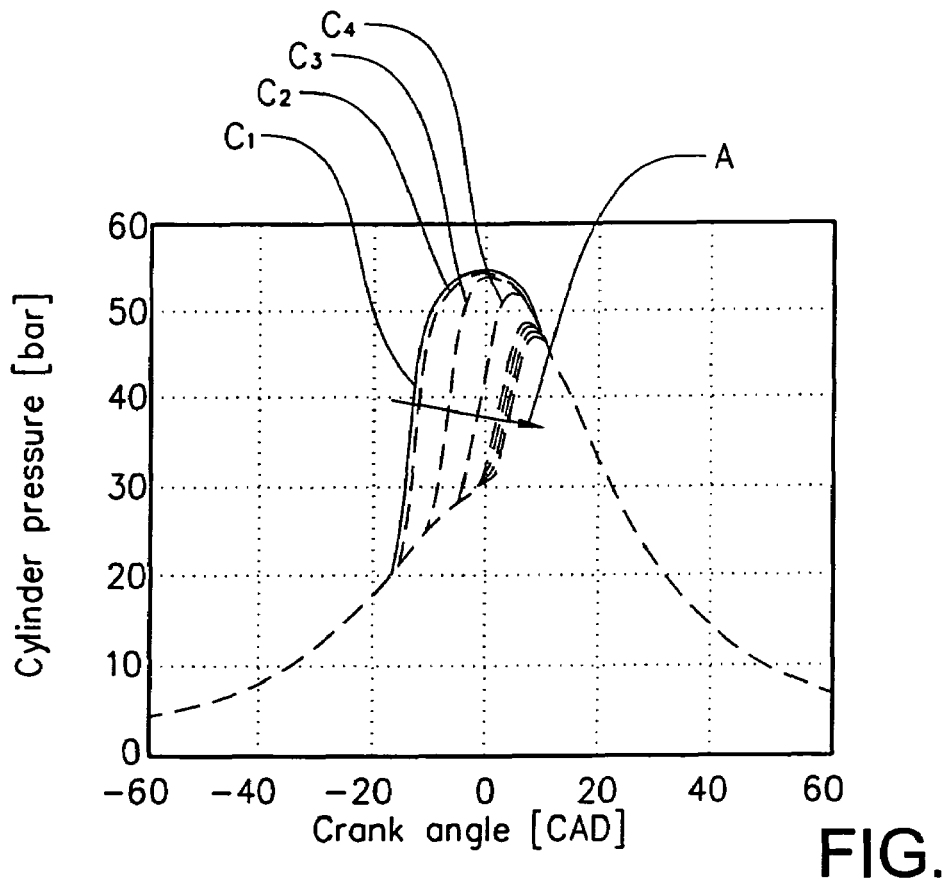
FIG. 1 shows a shows a diagram illustrating cylinder pressure traces for a number of consecutive engine cycles for a prior art engine.
Figure 2:
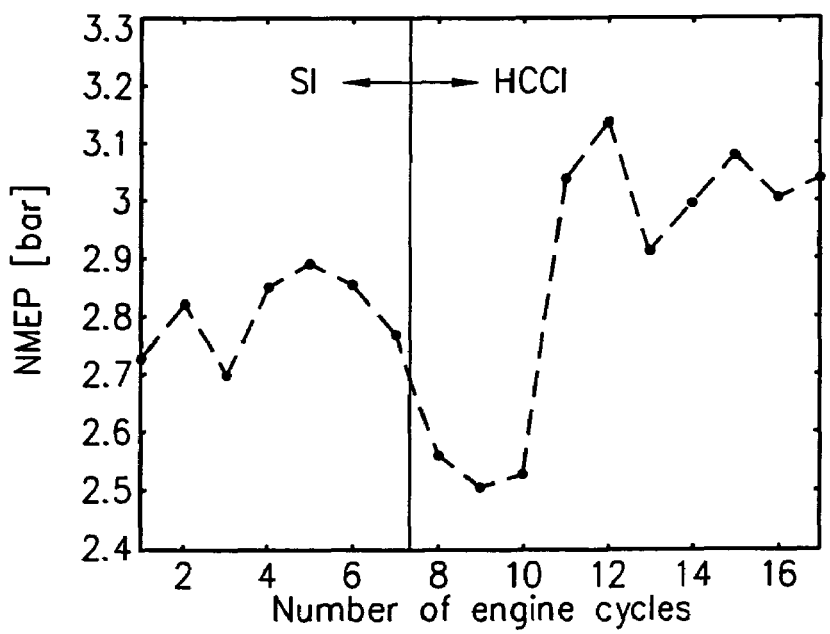
FIG. 2 shows a diagram illustrating variations in NMEP for a number of engine cycles before, during, and after a mode change.
Figure 5:
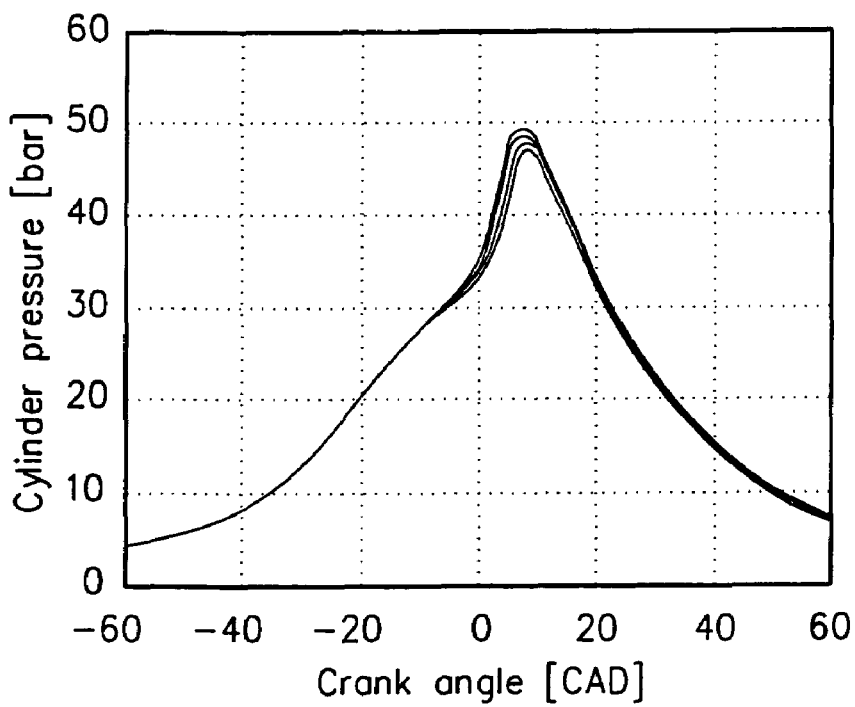
FIG. 5 shows a shows a diagram illustrating cylinder pressure traces for a number of consecutive engine cycles for an engine according to the invention.
Figure 6:
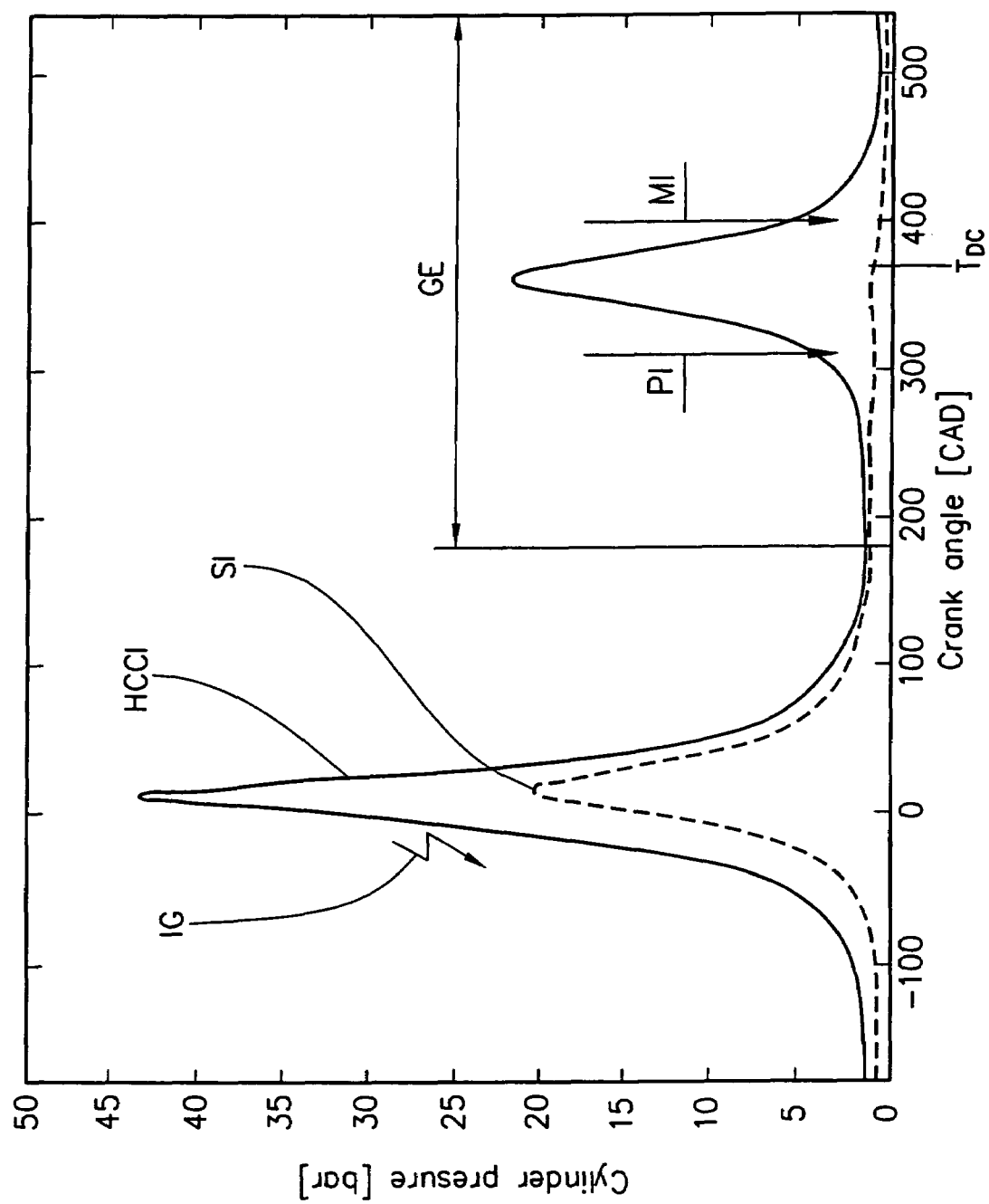
FIG. 6 shows a diagram illustrating the variation of cylinder pressure over crank angle for HCCI- and SI-mode.

When operating the engine according the above method, the residual gas fraction is increased stepwise for every engine cycle, for the first couple of engine cycles after a mode change, while the fresh air amount is decreased stepwise for every engine cycle. This results in an improved combustion stability during a mode change, as illustrated in FIG. 5, as the stepwise retardation of the ignition timing as shown in FIG. 1 can be reduced or eliminated.

When operating the engine, engine knocking, low combustion stability and a high noise level has to be avoided. Knocking, which is also a source of noise, is detected by measuring the peak pressure and/or pressure variations caused by a too rapid heat release during the expansion phase. Knocking occurs when the peak pressure exceeds an expected maximum pressure, or when a series of rapid pressure variations occur during the expansion phase. Low combustion stability is indicated by high cycle to cycle variations of the pressure during combustion. Typically, an engine operated in HCCI mode may oscillate between a late phased combustion (low cylinder pressure) and a subsequent early phased combustion (high cylinder pressure).

A more detailed explanation of HCCI operation under different engine operating conditions can be found in the SAE-paper SAE 2001-01-3610, the entirety of which is hereby incorporated into the description by reference. This SAE-paper discusses the influence of valve timing on HCCI auto-ignition delay and uses a number of valve timing events to identify a HCCI operational window.

The invention claimed is:

1. An internal combustion engine provided with at least one cylinder and comprising:
    a fuel supply, through which fuel is supplied to a combustion chamber;
    a piston in the engine cylinder whose compression action causes a mixture of air and fuel within the combustion chamber to be ignited;
    at least one inlet valve for admitting gas which includes fresh air into said cylinder;
    at least one exhaust valve for exhausting combusted gases from said cylinder;
    a sensor;
    a control unit electrically coupled to said inlet valve, said exhaust valve, said sensor, and said fuel supply to control the timing of said inlet and exhaust valves and fuel quantity supplied by said fuel supply, said control unit determining a desired combustion timing and a current combustion timing, said current combustion timing based on a signal from said sensor, said control unit further adjusting at least one of an exhaust valve closing time and an intake valve opening time such that said current combustion timing approaches said desired combustion timing wherein said exhaust closes before top dead center and said inlet valve opens after top dead center.

2. The engine of claim 1 wherein said adjustment of valve timing occurs during a switch between a spark ignition mode and a compression ignition mode.

3. The engine of claim 1 wherein said adjustment occurs for a predetermined number of engine cycles after said switch of mode.

4. The engine of claim 1 wherein said control unit adjusts intake and exhaust valve timing until combusting timing is stabilized.

5. A computer readable storage device having stored therein data representing instructions executable by a computer, the engine having a piston disposed in a cylinder to define a combustion chamber, intake valves with adjustable opening and closing timings for admitting fresh air into the cylinder, a fuel supply for supplying fuel to the combustion chamber, and exhaust valves with adjustable opening and closing timings for discharging exhaust gas resulting from combustion within the cylinder, said instructions comprising:
    instructions for closing the exhaust valve before top dead center during an exhaust stroke of the piston and opening the intake valve after top dead center during an induction stroke of the piston to achieve a negative overlap and retain residual exhaust gas;
    instructions for determining a current combustion timing;
    instructions for determining a desired combustion timing; and
    instructions to adjust intake and exhaust valve timing to adjust the negative overlap such that said current combustion timing becomes closer to said desired combustion timing in a successive engine cycle.

6. The computer readable storage device of claim 5 wherein said adjusting of intake and exhaust valve timing is performed in response to a mode switch from spark ignition to compression ignition.

7. The computer readable storage device of claim 5 wherein said adjustment occurs for a predetermined number of engine cycles following said mode switch.

8. The computer readable storage device of claim 5 wherein the adjustment size of valve timing for a subsequent cycle is based on said current combustion timing.

9. The computer readable storage device of claim 5 wherein said current combustion phasing is determined based on a signal from a sensor couple to the engine.

10. An internal combustion engine provided with at least one cylinder and comprising:
   a fuel supply, through which fuel is supplied to a combustion chamber;
   a piston disposed within the engine cylinder, the engine cylinder being configured to selectively operate in at least a spark ignition mode and a compression ignition mode;
   at least one inlet valve for admitting gas which includes fresh air into said cylinder;
   at least one exhaust valve for exhausting combusted gases from said cylinder;
   a control unit electrically coupled to said inlet valve, said exhaust valve, and said fuel supply, and configured to control operation of said inlet and exhaust valves and fuel quantity supplied by said fuel supply, said control unit being further configured to adjust operation of at least one of the inlet valve and the exhaust valve so as to successively increase, for each of at least two combustion cycles following a transition from spark ignition mode to compression ignition mode, an amount of recirculated exhaust gas within said cylinder.

11. The internal combustion engine of claim 10, wherein said control unit adjusts negative valve overlap of the inlet valve and the exhaust valve for each of at least two combustion cycles to stabilize auto-ignition timing to a desired value.

* * * * *